United States Patent
Kitamura et al.

(10) Patent No.: US 7,289,228 B2
(45) Date of Patent: Oct. 30, 2007

(54) OPTICAL DISPLACEMENT SENSOR, AND EXTERNAL FORCE DETECTING DEVICE

(75) Inventors: Atsushi Kitamura, Shizuoka-ken (JP); Shigeyuki Adachi, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 431 days.

(21) Appl. No.: 11/053,401

(22) Filed: Feb. 8, 2005

(65) Prior Publication Data
US 2005/0185196 A1   Aug. 25, 2005

(30) Foreign Application Priority Data
Feb. 25, 2004  (JP)  ............... 2004-049763

(51) Int. Cl.
*G01B 11/14* (2006.01)
(52) U.S. Cl. .................... 356/614; 250/208.6
(58) Field of Classification Search ........... 356/614, 356/482, 498, 152.3, 460; 250/221, 231.13, 250/206.1, 208.2, 208.6, 227.11, 231.18, 250/231.1, 559.32
See application file for complete search history.

(56) References Cited

U.S. PATENT DOCUMENTS 5,389,777 A * 2/1995 Chin ............... 250/214 PR

FOREIGN PATENT DOCUMENTS

| JP | 03-245028 | 10/1991 |
|----|-----------|---------|
| JP | 05-034512 | 2/1993  |
| JP | 05-107042 | 4/1993  |
| JP | 09-203610 | 8/1997  |

* cited by examiner

*Primary Examiner*—Gregory J. Toatley, Jr.
*Assistant Examiner*—Tri Ton
(74) *Attorney, Agent, or Firm*—Muirhead and Saturnelli, LLP

(57) ABSTRACT

In a six-axis force sensor, each optical displacement sensor comprises an optical module to emit a light and a reflecting member to reflect the light back to the optical module, such that the optical axis of the light from the optical module is aligned to the axial direction of the six-axis force sensor, rather than to the radial direction. Consequently, the six-axis force sensor can be downsized in the radial direction.

5 Claims, 8 Drawing Sheets y-axis direction

OPTICAL DISPLACEMENT SENSOR, AND EXTERNAL FORCE DETECTING DEVICE

BACKGROUND OF THE INVENTION

1. Field of the Invention

The present invention relates to an optical displacement sensor and an external force detecting device, and particularly to an optical displacement sensor which detects relative displacement between a reference object and a measurement object based on displacement of a light reception position, and further to an external force detecting device which detects an external force applied to the measurement object based on a signal outputted from the optical displacement sensor.

2. Description of the Related Art

An external force detecting device, such as a six-axis optical force sensor, is conventionally known, in which a displacement amount of an action section to receive an external force, namely a measurement object, relative to a support section to support the action section, namely a reference object, is detected by an optical displacement sensor, and the external force received at the action section is measured according to an output signal from the optical displacement sensor.

For example, a six-axis optical force sensor comprises optical displacement sensors to measure a six-axis direction displacement, based on which a six-axis force is calculated. Specifically, such a six-axis optical force sensor comprises three optical displacement sensors, each of which uses an optical sensor unit and is capable of measuring a two-axis (x and y) direction displacement, and which in combination enable measurement of a six-axis direction displacement. The optical displacement sensor comprises a light emitting diode (LED) as a light source and a photodiode (PD) assembly as a light receiving element, such that the LED opposes the PD assembly with their respective optical center axes aligned to each other. The PD assembly is composed of four PD's and receives light emitted from the LED at its center area equally shared by the four PD's, whereby displacement of light receiving position at the PD assembly, that is to say relative positional displacement between a component attached to the LED and a component attached to the PD assembly can be detected in the optical displacement sensor. In the six-axis optical force sensor, a six-axis force applied between the component attached to the LED and the component attached to the PD assembly is measured according to an output signal from each of the optical displacement sensors.

FIG. 1 is a plan view of a main body of a conventional six-axis optical force sensor 101 as disclosed in, for example, Japanese Patent Application Laid-Open No. H03-245028. The six-axis force sensor 101 is basically composed of the aforementioned main body shaped cylindrical, and top and bottom lids (not shown in the figure). Referring to FIG. 1, the main body is constituted basically by a frame 105, which integrally includes: a cylindrical support section 102; an action section 103 located centrally inside the support section 102 and adapted to receive an external force; and three elastic spoke sections 104 crookedly structured so as to be elastically deformed for an appropriate displacement amount corresponding to a force to be measured and supportably connecting the action section 103 to the support section 102. The frame 105 is made of a single piece of an aluminum alloy material and shaped by cutting and electric discharge machining. The support section 102 and the action section 103 are fixedly attached respectively to two components to which a measurement force is applied, and when a force applied acts on the six-axis force sensor 101 structured as described above, a micro-displacement with respect to three-axis direction and a micro-rotation with respect to three-axis rotational direction are generated between the support section 102 and the action section 103.

The six-axis force sensor 101 further includes three light sources 106 disposed at the inner circumference of the support section 102 at 120 degree intervals (i.e. at an equi-angular distance), and three optical sensors (light receiving elements) 108 disposed at the action section 103 at 120 degree intervals (i.e. at an equi-angular distance) so as to oppose respective three light sources 106 with mutual optical axes aligned to each other. Each optical sensor 108 and each light source 106 disposed opposite to the optical sensor 108 make up an optical displacement sensor 109.

FIG. 2 is an explanatory perspective view of the optical displacement sensor 109 shown in FIG. 1. As shown in FIG. 2, each of the optical sensors 108 is constituted by a PD assembly composed of four PD's 108a. The light sources 106 disposed so as to oppose respective optical sensors 108 are each constituted by an infrared high-intensity LED with a pinhole aperture provided at its front face, and light emitted from the LED 106 and passing through the pinhole aperture propagates diffusedly and impinges on the center portion of the optical sensor 108 so as to be substantially equally irradiated on all the four PD's 108a. If the support section 102 and the action section 103 are displaced relative to each other by an external force, then the light emitted from the LED 106 is irradiated unequally on the four PD's 108a, and light amounts received at respective four PD's 108a are measured for calculation of relative displacements with respect to x-and y-axis directions. And, the six-axis force sensor 101 calculates forces with respect to six-axis directions according to the above-calculated relative displacements, and a signal is outputted therefrom.

As described above with reference to FIGS. 1 and 2, the conventional six-axis optical force sensor 101 comprises: the frame 105 which includes elastic spoke sections 104 structured so as to be elastically deformed by an applied force to be measured; and three of the optical displacement sensors 109 each of which consists of the light source 106, and the optical sensor 108 adapted to detect the displacement according to the deformation.

The above-described six-axis force sensor (external force detecting device) is used mainly in industrial robots so as to detect external forces in controlling the wrist portions. For enhancing the performance in the motion of the robots, the six-axis force sensor is preferably incorporated also in the finger portions, which requires the six-axis force sensor to be downsized.

However, since, as described above, in the conventional six-axis force sensor the optical displacement sensors are arranged with their optical axes oriented in the radial direction of the force sensor, the light source size and the light receiving element size constitute a constraint in reducing the radial dimension of the external force detecting device.

SUMMARY OF THE INVENTION

The present invention has been made in light of the circumstances described above, and it is therefore an object of the present invention to provide an external force detecting device having a reduced radial dimension.

In order to achieve the object, optical displacement sensors capable of measuring displacement with respect to the optical axis direction are arranged with their optical axes oriented in the axial direction of an external force detecting device. Specifically, according to one aspect of the present invention, there is provided an optical displacement sensor comprising: an optical module which is mounted on one of a reference object and a measurement object, and which emits a light; and a reflecting member which is mounted on the other one of the reference object and the measurement object, has at least one diffraction grating provided at a surface thereof facing the optical module and including a plurality of grooves, and by which the light emitted by the optical module is reflected back to the optical module so as to be received there, whereby displacement of the measurement object relative to the reference object is measured. In the optical displacement sensor described above, the optical module defines: a first optical system which measures displacement in a first direction oriented parallel to the optical axis of the light emitted from the optical module and traveling toward the reflecting member, includes a first light source, a first light receiving element, and a first lens fixedly mounted in the optical module so as to keep a fixed distance from the first light receiving element, and in which a light emitted from the first light source passes through the first lens, impinges on and is reflected at the surface of the reflecting member facing the optical module, and is received at the first light receiving element, whereby a signal corresponding to the displacement in the first direction is generated; and a second optical system which measures displacement in a second direction aligned to a predetermined orientation in a plane perpendicular to the optical axis of the light emitted from the optical module and traveling toward the reflecting member, includes a second light source, a second light receiving element, and a second lens movably mounted in the optical module by a movable mechanism so as to move in the first direction only so that the light having passed through the second lens and impinging on the diffraction grating is allowed to have its focus set on the diffraction grating, and in which a light emitted from the second light source passes through the second lens, impinges on and is reflected at the diffraction grating provided at the surface of the reflecting member facing the optical module, and is received at the second light receiving element, whereby a signal corresponding to the displacement in the second direction is generated. Further, in the optical displacement sensor, the plurality of grooves of the diffracting grating run in a direction orthogonal to the second direction and are arrayed in the second direction.

In the one aspect of the present invention, the first and second light sources may comprise, in common, one light source, and one branching prism to branch a light from the one common light source into two lights, one of which constitutes the light emitted from the first light source, and the other one of which constitutes the light emitted from the second light source.

Further, in the one aspect of the present invention, the branching prism may have a first half-mirror film and a second half-mirror film disposed parallel to each other, wherein a light which passes through the first half-mirror film is directed to the second lens, and a light which is reflected at the first half-mirror film impinges on the second half-mirror film, is reflected there, and directed to the first lens.

Still further, in the one aspect of the present invention, an astigmatism generating portion may be provided at a side of the second half-mirror film opposite to a side facing the first half-mirror film.

According to another aspect of the present invention, an external force detecting device incorporates the optical displacement sensor according to the one aspect of the present invention, wherein the first direction is aligned to the axial direction of the device, and the second direction is aligned to a direction orthogonal to the radial direction of the device, whereby an external force applied to the reference object and the measurement object can be detected according to the signal corresponding to the displacement in the first direction and the signal corresponding to the displacement in the second direction.

According to the present invention, an optical displacement sensor is realized, which is capable of measuring displacement in the axial direction and also in a predetermined direction in a plane orthogonal to the axial direction, and a six-axis force sensor incorporating such optical displacement sensors can be downsized in the radial dimension.

BRIEF DESCRIPTION OF THE DRAWINGS

The present invention as defined in the claims can be better understood with reference to the text and to the following drawings:

DETAILED DESCRIPTION OF THE PREFERRED EMBODIMENTS

Figure 1:
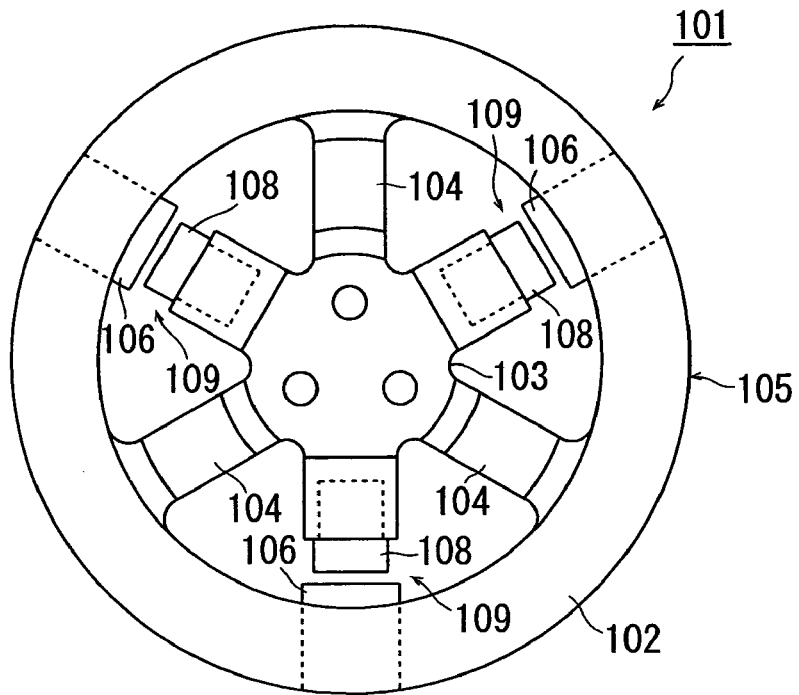
FIG. 1 is a top plan view of a conventional six-axis force sensor without its top lid.
Figure 2:
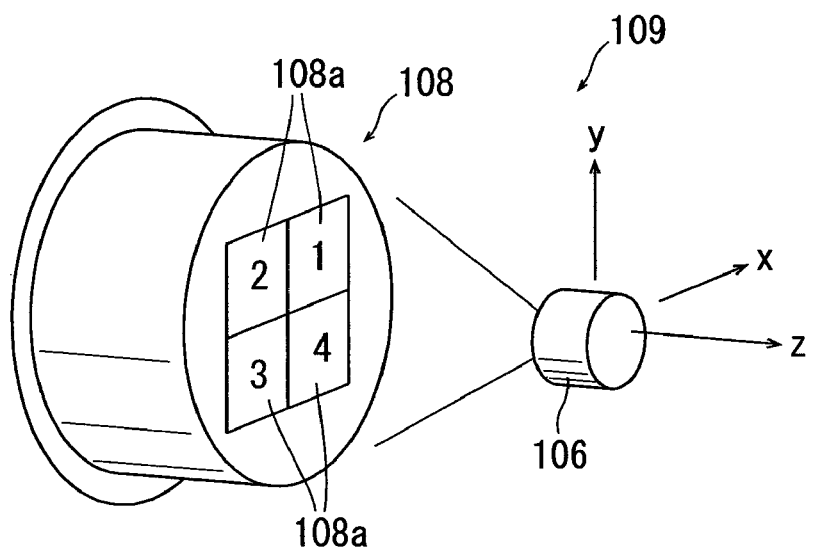
FIG. 2 is a perspective explanatory view of an optical sensor unit (optical displacement sensor) of the conventional six-axis force sensor of FIG. 1.

Preferred embodiments of the present invention will hereinafter be described with reference to the accompanying drawings. In the embodiments described below, an optical displacement sensor according to the present invention is applied to such a six-axis optical force sensor, for example, as shown in FIG. 1, but the present invention is not limited to application to an external force detecting device to detect six-axis force.

Figure 3:
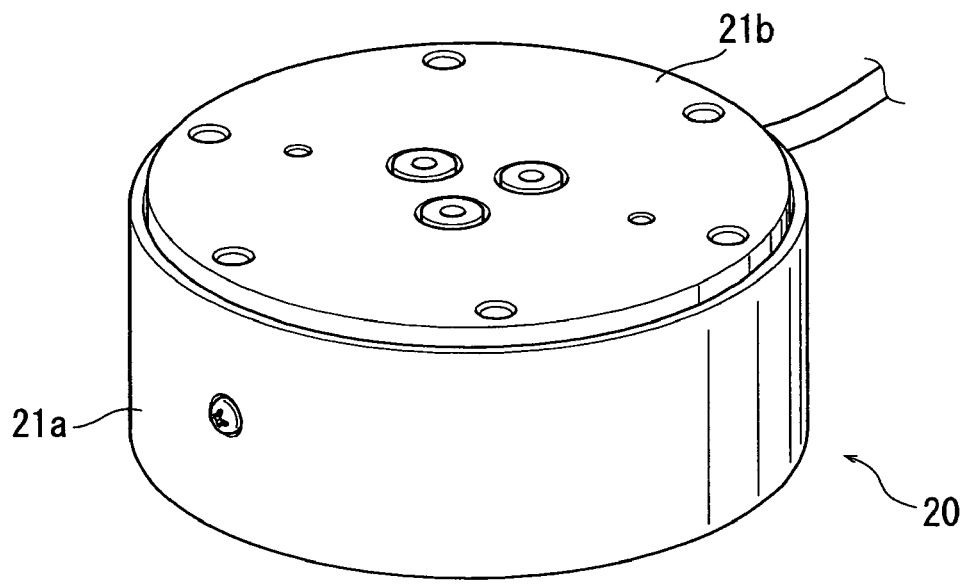
FIG. 3 is a perspective view of a six-axis force sensor according to the present invention.
Figure 4:
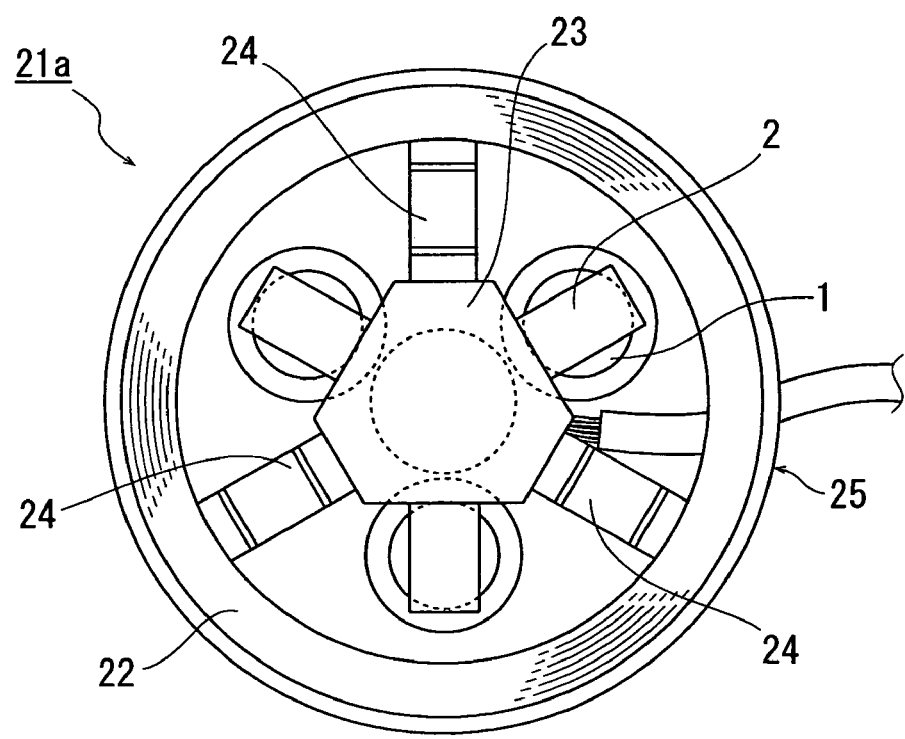
FIG. 4 is a top plan view of a main body of the six-axis force sensor of FIG. 3.
Figure 5:
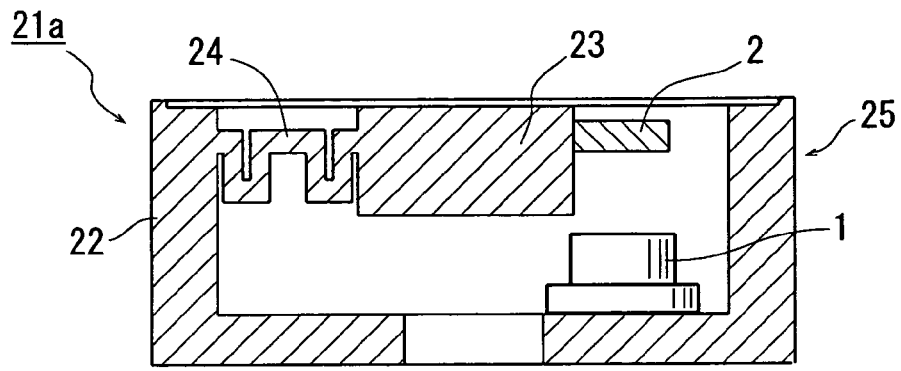
FIG. 5 is a side sectional view of the main body of FIG. 4.

Referring to FIG. 3, a six-axis force sensor 20 according to the present invention comprises a main body 21a shaped cylindrical, and a disk-like top lid 21b disposed at the top of the main body 21a. Referring then to FIGS. 4 and 5, the main body 21a of the six-axis force sensor 20 is constituted by a frame 25, which includes a cylindrical support section 22, an action section 23 disposed centrally inside the support section 22, and three elastic spoke sections 24 to connect the support section 22 and the action section 23. The frame 25 is made of a single piece of an aluminum alloy material and shaped by cutting and electric discharge machining, and the spoke sections 24 are crookedly structured so as to readily provide elastic deformation in all directions.

The support section 22 and the action section 23 are fixed respectively to two components to which a measurement force is applied, and when the applied force acts on the six-axis force sensor 20 structured as described above, micro-displacements with respect to three-axis directions and micro-rotations with respect to rotational directions thereabout are generated between the support section 22 and the action section 23.

As shown in FIGS. 4 and 5, three optical modules 1 are disposed at the support section 22 in rotation symmetry through 120 degrees, and three reflecting members 2 are disposed at the action section 23 in rotation symmetry through 120 degrees so as to correspond to respective positions of the three optical modules 1. More specifically, the three optical modules 1 are disposed so as to respectively oppose the three reflecting members 2 in the axial direction of the six-axis force sensor 20 so that light from each optical module 1 is reflected at each reflecting member 2 and received at the optical module 1. Thus, the optical modules 1 and the reflecting members 2 each constitute an optical sensor unit, namely, an optical displacement sensor.

Figure 6:
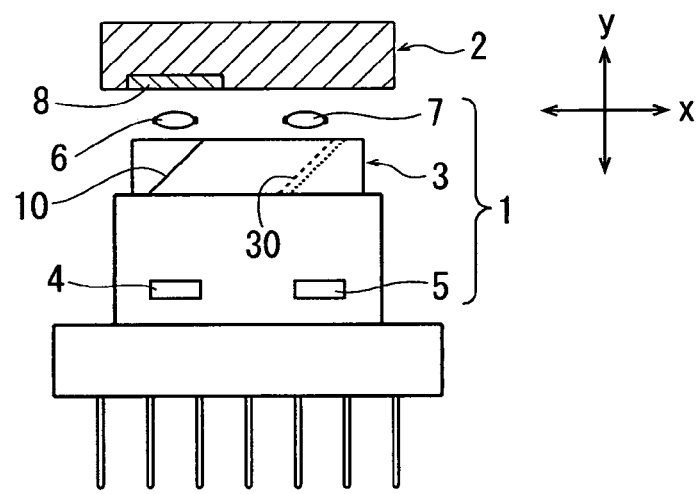
FIG. 6 is a schematic side view (partly sectioned) of a structure of an optical displacement sensor including an optical module and a reflecting member as shown in FIGS. 4 and 5, according to one embodiment of the present invention.

Referring to FIG. 6, each of the optical modules 1 comprises a light emitting/receiving element 4 composed of a light source (for example, a light emitting diode) and a light receiving part (for example, a photodiode), a light receiving element 5 (for example, a photodiode), a branching prism 3 to selectively direct a light in an intended direction, and objective lenses 6 and 7 as focusing means.

The branching prism 3 includes a half-mirror film 10 and a hetero-refractive index element 30. The hetero-refractive index element 30 has a half-mirror film disposed at a side thereof facing the half-mirror film 10, and has, at a side thereof opposite to the side facing the half-mirror film 10, a portion having a refractive index different from that of the base material of the branching prism 3. The refractive index of the portion of the hetero-refractive index element 30 may be higher or lower than that of the base material of the branching prism 3. This particular portion of the hetero-refractive index element 30 generates astigmatism for enabling the optical displacement sensor to measure displacement amount in the axial direction (defined as a first direction) of a force sensor.

The reflecting member 2 has a reflection surface formed at a side thereof facing the optical module 1, and a diffraction grating 8 is provided at an area of the reflection surface corresponding to the light emitting/receiving element 4. There may not be provided a diffraction grating at an area of the reflection surface corresponding to the light receiving element 5. The diffraction grating 8 comprises a plurality of grooves running in the radial direction of a force sensor and arrayed in a direction (defined as a second direction) orthogonal to the radial direction. The optical module 1 and the reflecting member 2 are disposed in parallel with each other and adapted to be displaced with respect to each other.

Figure 7:
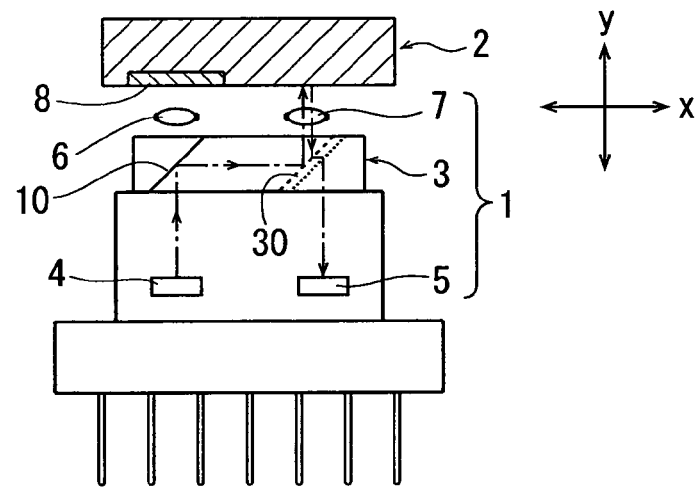
FIG. 7 is an explanatory view of a light path in the optical displacement sensor of FIG. 6.

Referring to FIG. 7, in the structure comprising the combination of the optical module 1 and the reflecting member 2 as shown in FIG. 6, a light from the light emitting/receiving element 4 is partly reflected at the half-mirror film 10, then reflected at the hetero-refractive index element 30, passes through the objective lens 7, impinges on the reflection surface of the reflecting member 2, and is reflected there. The reflected light passes through the objective lens 7, passes through the hetero-refractive index element 30, and impinges on the light receiving element 5. The objective lens 7 is fixedly attached to, for example, the case portion of the optical module 1 so as to keep a certain distance from the light receiving element 5.

Thus, in the optical displacement sensor structured as shown in FIG. 6, displacement in the axial direction of a force sensor, namely the y-axis direction (the first direction) indicated in FIG. 7 can be detected by means of the light received at the light receiving element 5. For detecting the displacement in the axial direction, a principle of, for example, an astigmatic method or a beam size method, both of which are well known and applied to focus control for an optical pickup, may be employed. In the astigmatic method, an astigmatism generating portion, such as the aforementioned hetero-refractive index element 30 in the branching prism 3, is required. Also, a well-known technology, for example, an optical displacement gauge as disclosed in Japanese Utility Model Application Laid-Open No. H05-34512, or a focus detecting device as disclosed in Japanese Patent Application Laid-Open No. H09-203610, may be employed.

Figure 8:
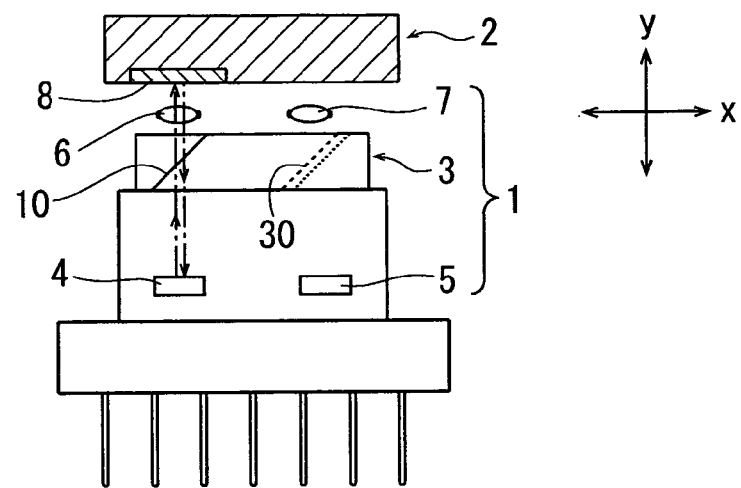
FIG. 8 is an explanatory view of another light path in the optical displacement sensor of FIG. 6.

Referring now to FIG. 8 showing a light path different from that shown in FIG. 7, a light from the light emitting/receiving element 4 partly passes through the half-mirror film 10, then passes through the objective lens 6, impinges on the diffraction grating 8 at the reflection surface of the reflecting member 2, and is reflected there. The reflected light passes through the objective lens 6, then passes through the half-mirror film 10, and impinges on the light emitting/receiving element 4. In this connection, the objective lens 6 is attached movably in the axial direction to enable adjustment of the distance from the reflecting member 2 so that the light is allowed to have its focus set on the diffraction grating 8 as described later.

Thus, in the optical displacement sensor structured as shown in FIG. 6, displacement in the direction orthogonal to the radial direction of a force sensor, namely in the x-axis direction (the second direction) indicated in FIG. 8 can be detected by the light received at the light emitting/receiving element 4. For detecting the displacement in the direction orthogonal to the axial direction, a principle of, for example, a push-pull method, which is well known and applied to tracking control for an optical pickup, may be employed. Also, a well-known technology, for example, a position detecting method by diffraction grating as disclosed in Japanese Patent Application Laid-Open No. H05-107042, may be employed.

The structure described above as shown in FIG. 6 employs the light emitting/receiving element 4 which includes, as a package, a light source (for example, a light emitting diode) and a light receiving part (for example, a photodiode). The present invention is not limited to this structure, but alternatively a light source and a light receiving part may be separated from each other as shown in FIG. 9.

Figure 9:
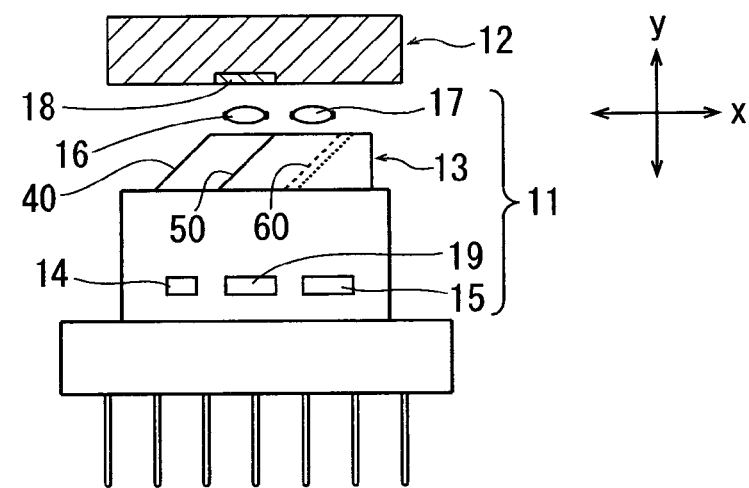
FIG. 9 is a schematic side view (partly sectioned) of a structure of an optical displacement sensor including an optical module and a reflecting member, according to another embodiment of the present invention.

Referring to FIG. 9, an optical module 11 comprises a light source 14 (for example, a light emitting diode), a light receiving element 19 (for example, a photodiode), a light receiving element 15 (for example, a photodiode), a branching prism 13 to selectively direct a light in an intended direction, and objective lenses 16 and 17 as focusing means.

The branching prism 13 is shaped to define a high-reflectance film 40, includes a half-mirror film 50 and a hetero-refractive index element 60, and functions to branch and direct a light in an intended direction. The hetero-refractive index element 60 is the same as the hetero-refractive index element 30 shown in FIG. 6, and a detailed description thereof will be omitted.

The reflecting member 12 has a reflection surface formed at a side thereof facing the optical module 11, and a diffraction grating 18 is provided at an area of the reflection surface corresponding to the light receiving element 19. A diffraction grating may or may not be provided at an area of the reflection surface corresponding to the light receiving element 15.

Figure 10:
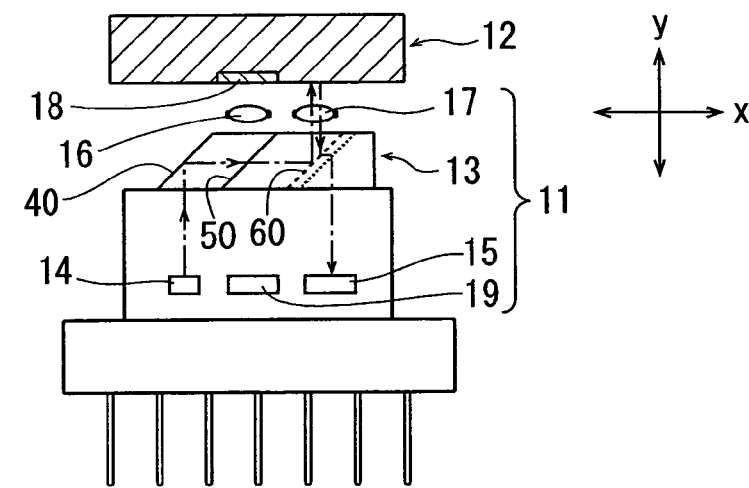
FIG. 10 is an explanatory view of a light path in the optical displacement sensor of FIG. 9.

Referring to FIG. 10, in the structure shown in FIG. 9, a light from the light source 14 is reflected at the high-reflectance film 40, partly passes through the half-mirror film 50, is reflected at the hetero-refractive index element 60, passes through the objective lens 17, impinges on the reflection surface of the reflecting member 12, and is reflected there. The reflected light passes through the objective lens 17, passes through the hetero-refractive index element 60, and impinges on the light receiving element 15. The objective lens 17 is fixedly attached to, for example, the case portion of the optical module 11 so as to keep a certain distance from the light receiving element 15.

Thus, in the optical displacement sensor structured as shown in FIG. 9, displacement in the axial direction of a force sensor, namely the y-axis direction indicated in FIG. 10 can be detected by means of the light received at the light receiving element 15. The method for detecting the displacement in the axial direction is the same as explained above with reference to FIG. 7.

Figure 11:
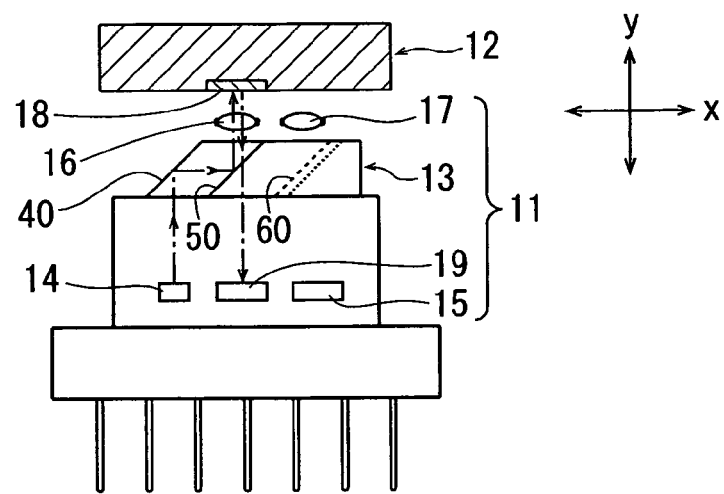
FIG. 11 is an explanatory view of another light path in the optical displacement sensor of FIG. 9.

Referring now to FIG. 11 showing a light path different from that shown in FIG. 10, a light from the light source 14 is reflected at the high-reflectance film 40, partly reflected at the half-mirror film 50, passes through the objective lens 16, impinges on the diffraction grating 18 at the reflection surface of the reflecting member 12, and is reflected there. The reflected light passes through the objective lens 16, passes through the half-mirror film 50, and impinges on the light receiving element 19. In this connection, the objective lens 16 is attached movably in the axial direction to enable adjustment of the distance from the reflecting member 12 so that the light is allowed to have its focus set on the diffraction grating 18 as described later.

Thus, in the optical displacement sensor structured as shown in FIG. 9, displacement in the direction orthogonal to the radial direction of a force sensor, namely in the x-axis direction indicated in FIG. 11 can be detected by the light received at the light receiving element 19. The method for detecting the displacement in the direction orthogonal to the axial direction is the same as explained above with reference to FIG. 8.

A description will hereinafter be made on how objective lenses are mounted in an optical module.

Figure 12:
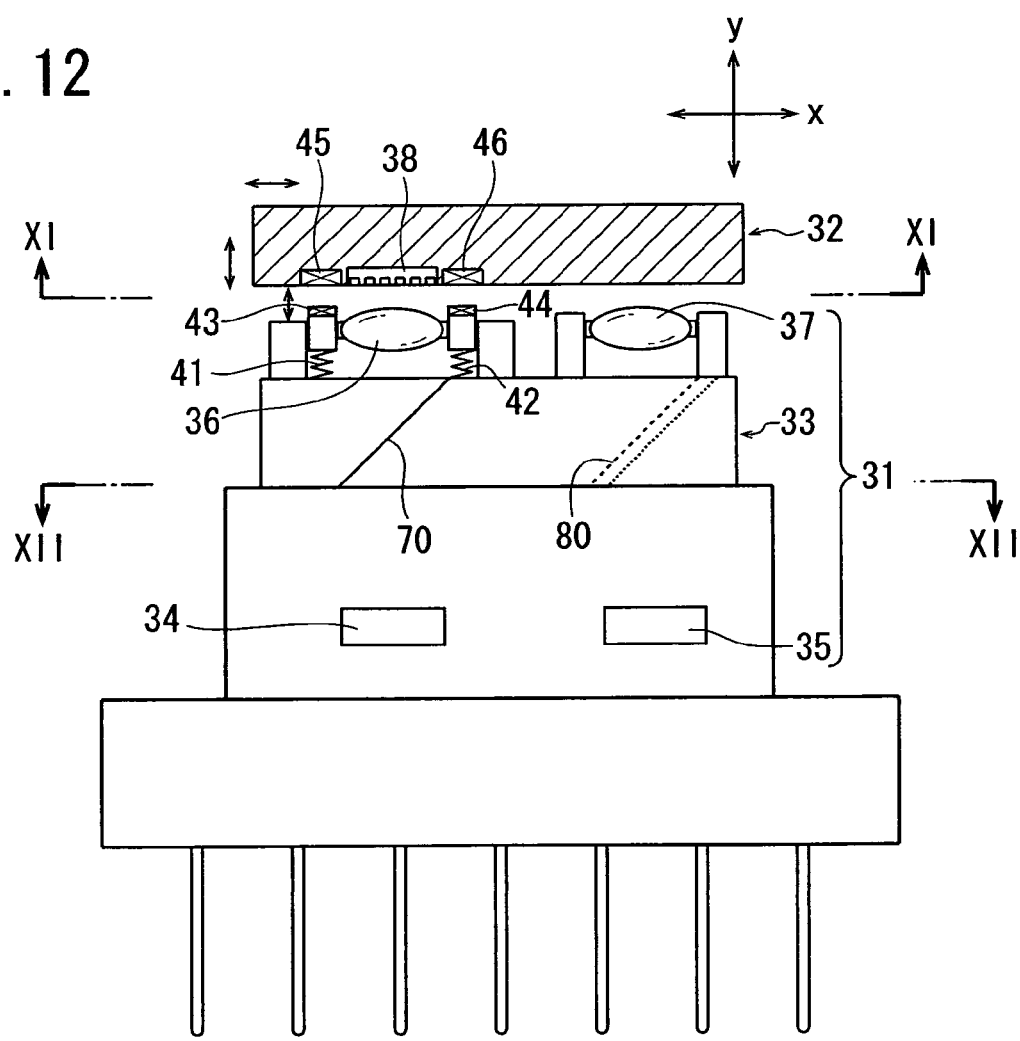
FIG. 12 is a schematic side view of a structure of an optical displacement sensor, showing how objective lenses are attached in an optical module.

Referring to FIG. 12, an optical module 31 corresponds to an optical module 1 shown in FIG. 6, specifically a light emitting/receiving element 34, a light receiving element 35, a branching prism 33, a half-mirror film 70, a hetero-refractive index element 80, an objective lens 36, and an objective lens 37 correspond to a light emitting/receiving element 4, a light receiving element 5, a branching prism 3, a half-mirror film 10, a hetero-refractive index element 30, an objective lens 6, and an objective lens 7 shown in FIG. 6, respectively, and a reflecting member 32 with a diffraction grating 38 corresponds to a reflecting member 2 with a diffraction grating 8 shown in FIG. 6, and these components operate in the same way as explained above with reference to FIGS. 7 and 8.

While the objective lens 37 is fixedly mounted to the top of the branching prism 33 thereby keeping a fixed distance from the light receiving element 35, the objective lens 36 is movably mounted by means of a movable mechanism.

The movable mechanism is structured such that magnets 43, 44 are provided at a lens mounting frame so as to face magnets 45, 46, respectively, which are provided at the reflection surface of the reflecting member 32. The magnets 43 and 45 have a same polarity, and the magnets 44 and 46 have a same polarity, so that the objective lens 36 and the reflecting member 32 repel each other.

Also, the movable mechanism includes springs 41, 42 between the lens mounting frame and the branching prism 33, and thereby the objective lens 36 and the branching prism 33 are made to repel each other, wherein the objective lens 36 is prevented from moving relative to the branching prism 33 in any directions perpendicular to the axial direction of a force sensor. Thus, due to the equilibrium established by the magnet repulsion and the spring repulsion, the distance between the objective lens 36 and the light emitting/receiving element 34 is controlled automatically to be kept as intended.

The position of the objective lens is controlled by means of the movable mechanism leveraging magnet repulsion and spring repulsion in the above embodiment, but may be controlled by any type movable mechanism.

Next, the diffraction grating 38 provided at the reflecting member 32, and the light emitting/receiving element 34 and the light receiving element 35 of the optical module 31 will be described.

Figure 13:
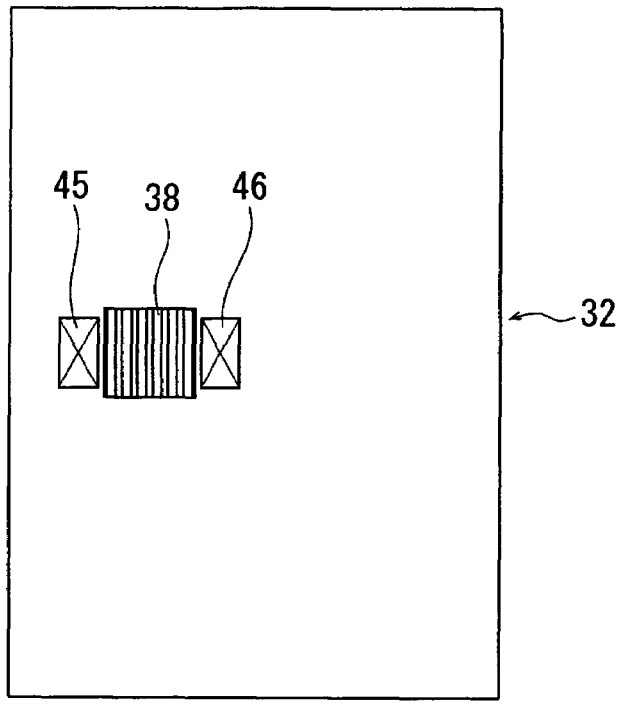
FIG. 13 is a plan view of a reflecting member shown in FIG. 12, seen in a direction shown by XI in FIG. 12.

Referring to first FIG. 13, the diffraction grating 38 has a plurality of grooves which run in the radial direction of a force sensor and are arrayed in the direction orthogonal to the radial direction in the same way as the above-described diffraction grating 8.

Figure 14:
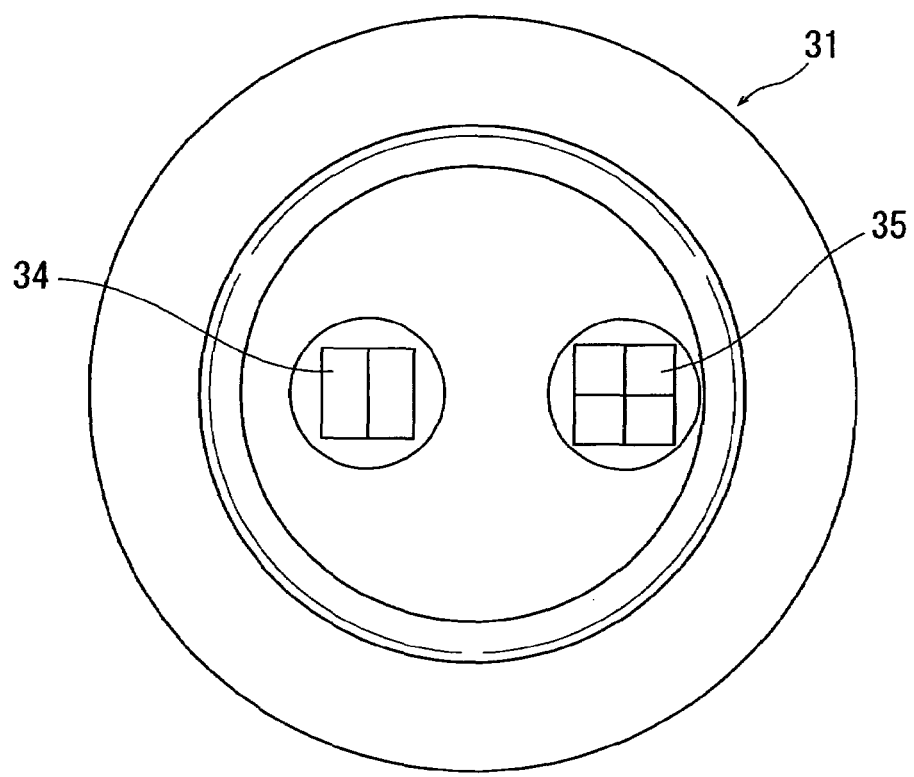
FIG. 14 is a plan view of the optical module shown in FIG. 12, seen in a direction shown by XII in FIG. 12 so as to show light receiving faces of a light emitting/receiving element and a light receiving element.

Referring then to FIG. 14, the light emitting/receiving element 34 includes a light receiving part whose light receiving face is divided into two sections by a line running in the radial direction so that displacement in the direction orthogonal to the radial direction can be detected based on the outputs of the two sections. And, the light receiving element 35 has its light receiving face divided into four sections by two lines running respectively in the radial direction and in the direction orthogonal to the radial direction so that displacement in the axial direction of a force sensor can be detected based on the outputs of the four sections.

Figure 15A:
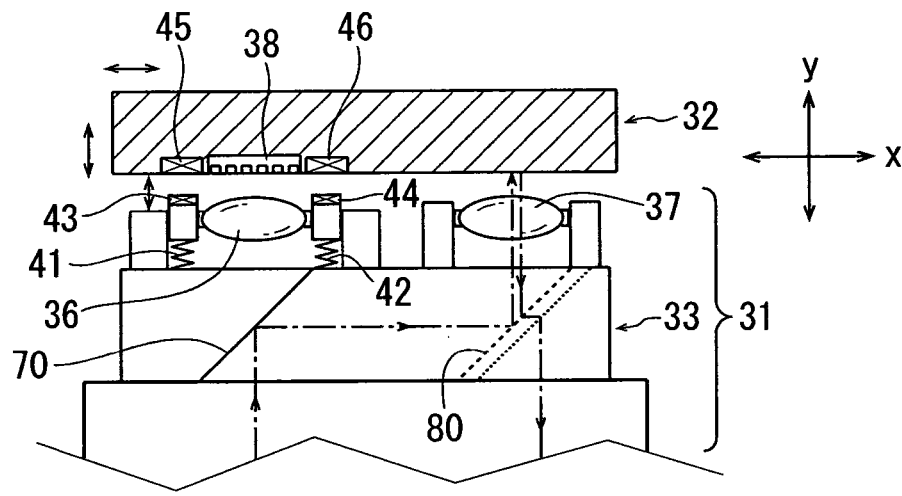
FIG. 15A is an explanatory view of a light path applied when an axial displacement is detected by the optical displacement sensor of FIG. 12.
Figure 15B:
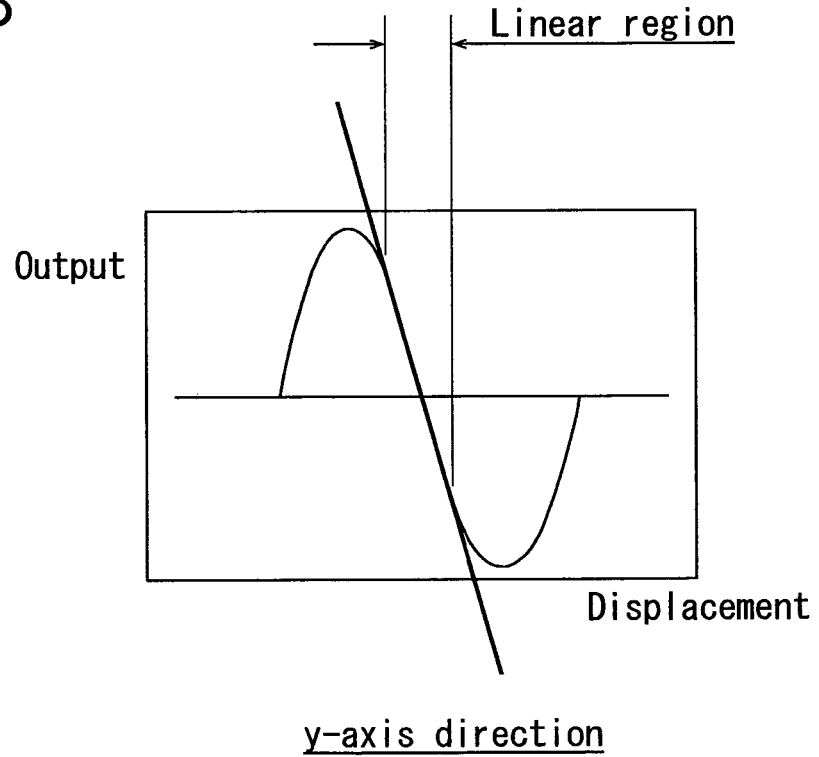
FIG. 15B is a graph showing an output by the light receiving element.

Referring to FIG. 15A showing a light path in the structure of FIG. 12, the light path shown therein is the same as the light path shown in FIG. 7, and when the optical module 31 and the reflecting member 32 are displaced with respect to each other in the axial direction, namely in the y-axis direction, the output of the light receiving element 35 changes as shown in FIG. 15B. The output change includes a linear region as indicated in FIG. 15B, and the displacement in the axial direction can be measured by utilizing the linear region.

Figure 16A:
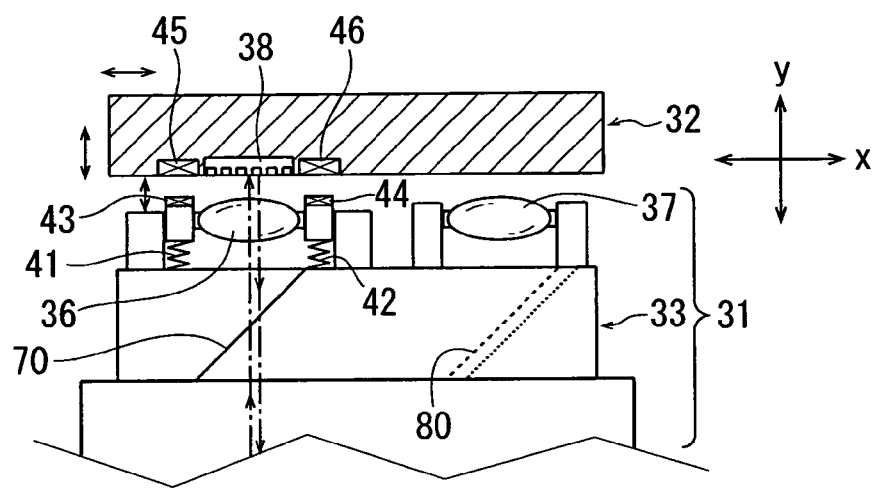
FIG. 16A is an explanatory view of a light path applied when a displacement orthogonal to a radial direction is detected by the optical displacement sensor of FIG. 12.
Figure 16B:
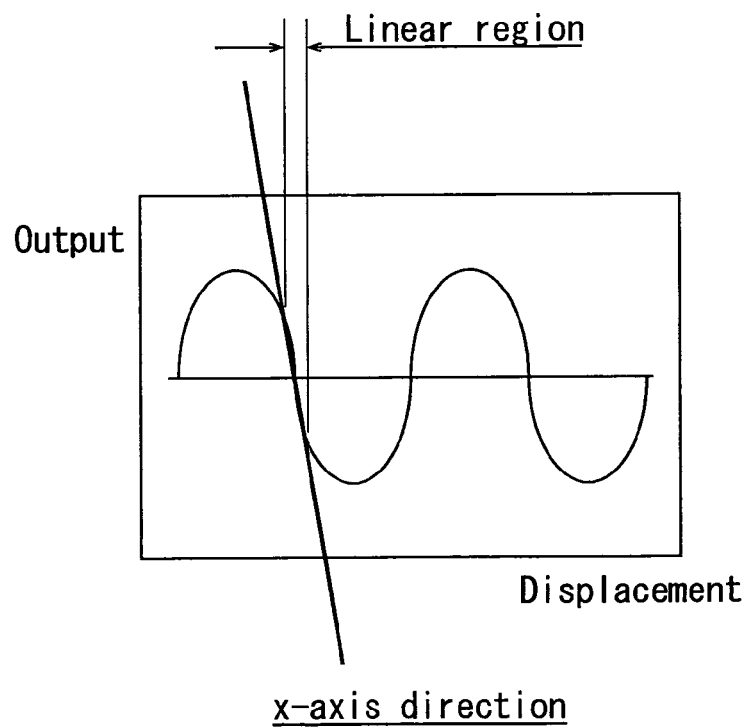
FIG. 16B is a graph showing an output by the light emitting/receiving element.

Referring to FIG. 16A showing another light path in the structure of FIG. 12, the light path shown therein is the same as the light path shown in FIG. 8, and when the optical module 31 and the reflecting member 32 are displaced with respect to each other in the direction orthogonal to the radial direction, namely in the x-axis direction, the output of the light receiving part of the light emitting/receiving element 34 changes as shown in FIG. 16B. The output change includes a linear region as indicated in FIG. 16B, and the displacement in the direction orthogonal to the radial direction can be measured by utilizing the linear region.

In the embodiments described above, only one light source is employed in each optical displacement sensor, but the present invention is not limited to this arrangement and may alternatively be arranged such that two separate light sources are used for detecting respective displacements in the axial direction of a force sensor and in the direction orthogonal to the radial direction of a force sensor.

Further, in the embodiments described above, the direction, which is in the plane orthogonal to the axial direction, and with respect to which displacement is measured, is arranged to be orthogonal to the radial direction for the purpose of matching conventional optical six-axis force sensors. The present invention is not limited to this arrangement, and the direction may be optionally arranged, for example, aligned to the radial direction, depending on the specification of an external force detecting device.

The optical displacement sensor according to the present invention can be applied to a six-axis force sensor as explained above, and can be applied further to measurement of various physical quantities that can be detected based on displacement.

While the present invention has been particularly shown and described with references to preferred embodiments thereof, it will be understood by those skilled in the art that various changes in form and details may be made therein without departing from the spirit and scope of the invention as defined by the appended claims.

What is claimed is:

1. An optical displacement sensor comprising:
an optical module which is mounted on one of a reference object and a measurement object, and which emits a light; and
a reflecting member which is mounted on the other one of the reference object and the measurement object, has at least one diffraction grating provided at a surface thereof facing the optical module and including a plurality of grooves, and by which the light emitted by the optical module is reflected back to the optical module so as to be received there, whereby displacement of the measurement object relative to the reference object is measured,
wherein the optical module defines:
a first optical system which measures displacement in a first direction oriented parallel to an optical axis of the light emitted from the optical module and traveling toward the reflecting member, includes a first light source, a first light receiving element, and a first lens fixedly mounted in the optical module so as to keep a fixed distance from the first light receiving element, and in which a light emitted from the first light source passes through the first lens, impinges on and is reflected at the surface of the reflecting member facing the optical module, and is received at the first light receiving element, whereby a signal corresponding to the displacement in the first direction is generated; and
a second optical system which measures displacement in a second direction aligned to a predetermined orientation in a plane perpendicular to the optical axis of the light emitted from the optical module and traveling toward the reflecting member, includes a second light source, a second light receiving element, and a second lens movably mounted in the optical module by a movable mechanism so as to move in the first direction only so that the light having passed through the second lens and impinging on the diffraction grating is allowed to have its focus set on the diffraction grating, and in which a light emitted from the second light source passes through the second lens, impinges on and is reflected at the diffraction grating provided at the surface of the reflecting member facing the optical module, and is received at the second light receiving element, whereby a signal corresponding to the displacement in the second direction is generated, and
wherein the plurality of grooves of the diffraction grating run in a direction orthogonal to the second direction and are arrayed in the second direction.

2. An optical displacement sensor according to claim 1, wherein the first and second light sources comprise, in common, one light source, and one branching prism to branch a light from the one common light source into two lights, one of the two lights constituting the light emitted from the first light source, and the other one thereof constituting the light emitted from the second light source.

3. An optical displacement sensor according to claim 2, wherein the branching prism has a first half-mirror film and a second half-mirror film disposed parallel to each other, and wherein a light which passes through the first half-mirror film is directed to the second lens, and a light which is reflected at the first half-mirror film impinges on the second half-mirror film, is reflected there, and directed to the first lens.

4. An optical displacement sensor according to claim 3, wherein an astigmatism generating portion is provided at a side of the second half-mirror film opposite to a side facing the first half-mirror film.

5. An external force detecting device comprising the optical displacement sensor according to claim 1, wherein the first direction is aligned to an axial direction of the device, and the second direction is aligned to a direction orthogonal to a radial direction of the device, whereby an external force applied to the reference object and the measurement object can be detected according to the signal corresponding to the displacement in the first direction and the signal corresponding to the displacement in the second direction.

* * * * *